(12) United States Patent
Hwang et al.

(10) Patent No.: US 10,102,540 B2
(45) Date of Patent: Oct. 16, 2018

(54) DEVICE AND METHOD FOR ENFORCING ADVERTISEMENT VIEWING

(75) Inventors: Sung-Oh Hwang, Yongin-si (KR); Sergey Nikolayevich Seleznev, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 588 days.

(21) Appl. No.: 13/216,771

(22) Filed: Aug. 24, 2011

(65) Prior Publication Data

US 2012/0054006 A1    Mar. 1, 2012

(30) Foreign Application Priority Data

Aug. 24, 2010    (KR) .................. 10-2010-0082187

(51) Int. Cl.
*G06Q 30/02* (2012.01)

(52) U.S. Cl.
CPC ............................... *G06Q 30/0241* (2013.01)

(58) Field of Classification Search
None
See application file for complete search history.

(56) References Cited

U.S. PATENT DOCUMENTS

| | | | | |
|---|---|---|---|---|
| 8,595,490 B2 * | 11/2013 | von Mueller | ........ | G06Q 20/085 |
| | | | | 705/35 |
| 8,671,000 B2 * | 3/2014 | Aaltonen | ........................... | 705/4 |
| 2006/0117391 A1 * | 6/2006 | Kim | ........................ | G06Q 30/02 |
| | | | | 726/27 |
| 2008/0114688 A1 | 5/2008 | Martinez et al. | | |
| 2008/0115228 A1 * | 5/2008 | Martinez | ............... | G06F 21/105 |
| | | | | 726/30 |
| 2008/0270242 A1 * | 10/2008 | Aaltonen | ............... | G06Q 30/02 |
| | | | | 705/14.64 |
| 2009/0094160 A1 * | 4/2009 | Webster | ................. | G06Q 30/02 |
| | | | | 705/51 |
| 2009/0157552 A1 | 6/2009 | Schnell et al. | | |
| 2009/0198542 A1 * | 8/2009 | D'Amore | ............... | G06Q 30/02 |
| | | | | 705/14.15 |
| 2010/0185854 A1 | 7/2010 | Burns et al. | | |
| 2013/0024890 A1 | 1/2013 | Hwang et al. | | |

(Continued)

FOREIGN PATENT DOCUMENTS

| | | |
|---|---|---|
| CN | 101095136 | 12/2007 |
| CN | 101296359 | 10/2008 |
| CN | 101535982 | 9/2009 |

(Continued)

OTHER PUBLICATIONS

Renato Iannella, "A Review of the OMA DRM V2 ODRL Profile", The Second International ODRL Workshop, 2005.

(Continued)

*Primary Examiner* — James D Nigh
(74) *Attorney, Agent, or Firm* — The Farell Law Firm, P.C.

(57) ABSTRACT

A method and device for enforcing advertisement viewing in the device are provided. When there is a play request for contents, it is determined whether there is a common Rights Object (RO) linked with an RO of the requested contents. When there is a common RO, information about consumption of advertisements on a plurality of contents is obtained from the common RO. At least one advertisement linked with the requested contents is played on the basis of the obtained information.

7 Claims, 8 Drawing Sheets

(56) References Cited

U.S. PATENT DOCUMENTS

| | | | |
|---|---|---|---|
| 2013/0030906 A1 | 1/2013 | Hwang et al. | |
| 2013/0030912 A1* | 1/2013 | Chu | G06F 21/10 |
| | | | 705/14.49 |

FOREIGN PATENT DOCUMENTS

| | | |
|---|---|---|
| JP | 2002-109251 | 4/2002 |
| JP | 2008-519367 | 6/2008 |
| JP | 2009-206535 | 9/2009 |
| JP | 2012-515976 | 7/2012 |
| JP | 2013-524337 | 6/2013 |
| JP | 2013-525875 | 6/2013 |
| KR | 1020020073626 | 9/2002 |
| KR | 1020060040489 | 5/2006 |
| KR | 1020080027040 | 3/2008 |
| KR | 1020090021514 | 3/2009 |
| KR | 1020090032217 | 4/2009 |
| WO | WO 2009/099866 | 8/2009 |
| WO | WO 2010/031413 | 3/2010 |

OTHER PUBLICATIONS

Chinese Office Action dated Apr. 29, 2015 issued in counterpart application No. 201180040134.0.

Chinese Office Action dated Dec. 17, 2015 issued in counterpart application No. 201180040134.0, 16 pages.

Korean Office Action dated Oct. 20, 2016 issued in counterpart application No. 10-2010-0082187, 9 pages.

\* cited by examiner

FIG.1

```
<o-ex:rights
 xmlns:o-ex="http://odrl.net/1.1/ODRL-EX"
 xmlns:o-dd="http://odrl.net/1.1/ODRL-DD"
xmlns:oma-dd="http://www.openmobilealliance.com/oma-dd"
 xmlns:ds="     <http://www.w3.org/2000/09/xmldsig#>"
 xmlns:xenc="http://www.w3.org/2001/04/xmlenc#"
 o-ex:id="example.1">
 <o-ex:context>
  <o-dd:version>2.2</o-dd:version>
  <o-dd:uid>RightsObjectID</o-dd:uid>
 </o-ex:context>
 <o-ex:agreement>
  <o-ex:asset o-ex:id="Normal Content">
   <o-ex:context>
    <o-dd:uid>ContentID</o-dd:uid>
   </o-ex:context>
   <o-ex:digest>
    <ds:DigestMethod
Algorithm="http://www.w3.org/2000/09/xmldsig#sha1"/>
    <ds:DigestValue>DCFHash</ds:DigestValue>
   </o-ex:digest>
   <ds:KeyInfo>
    <xenc:EncryptedKey>
     <xenc:EncryptionMethod
Algorithm="http://www.w3.org/2001/04/xmlenc#kw-aes128"/>
     <ds:KeyInfo>
      <ds:RetrievalMethod URI="REKReference"/>
     </ds:KeyInfo>
     <xenc:CipherData>
      <xenc:CipherValue>EncryptedCEK</xenc:CipherValue>
     </xenc:CipherData>
    </xenc:EncryptedKey>
   </ds:KeyInfo>
  </o-ex:asset>
  <o-ex:asset o-ex:id="Advertisement Content">
   <o-ex:context>
    <o-dd:uid>ContentID</o-dd:uid>
   </o-ex:context>
   <o-ex:digest>
```

FIG.2

```
<ds:DigestMethod
Algorithm="http://www.w3.org/2000/09/xmldsig#sha1"/>
  <ds:DigestValue>DCFHash</ds:DigestValue>
 </o-ex:digest>
 <ds:KeyInfo>
  <xenc:EncryptedKey>
   <xenc:EncryptionMethod
     Algorithm="http://www.w3.org/2001/04/xmlenc#kw-aes128"/>
   <ds:KeyInfo>
    <ds:RetrievalMethod URI="REKReference"/>
   </ds:KeyInfo>
   <xenc:CipherData>
     <xenc:CipherValue>EncryptedCEK</xenc:CipherValue>
   </xenc:CipherData>
  </xenc:EncryptedKey>
 </ds:KeyInfo>
</o-ex:asset>
<o-ex:permission>
 <o-ex:asset o-ex:idref="Normal Content"/>  ~305
 <o-dd:play>
  <o-ex:requirement>
   <o-dd:playout>
    <o-ex:asset o-ex:idref="Advertisement Content#1"/>
     <o-dd:enforcement-duration>180</o-dd:enforcement-duration>
   </o-dd:playout>
   <o-dd:displayout>
    <o-ex:asset o-ex:idref="Advertisement Content#2"/>
     <o-dd:enforcement-duration>30</o-dd:enforcement-duration>
   </o-dd:displayout>
   <o-dd:executeout>
    <o-ex:asset o-ex:idref="Advertisement  ontent#3"/>
   </o-dd:executeout>
  </o-ex:requirement>
 </o-dd:play>
</o-ex:permission>
</o-ex:agreement>
</o-ex:rights>
```

```xml
<o-ex:rights
  xmlns:o-ex="http://odrl.net/1.1/ODRL-EX"
  xmlns:o-dd="http://odrl.net/1.1/ODRL-DD"
  xmlns:oma-dd="http://www.openmobilealliance.com/oma-dd"
  xmlns:ds="http://www.w3.org/2000/09/xmldsig#"
  xmlns:xenc="http://www.w3.org/2001/04/xmlenc#"
  o-ex:id="C.5c">
  <o-ex:context>
    <o-dd:version>2.2</o-dd:version>
    <o-dd:uid>RightsObjectID</o-dd:uid>
  </o-ex:context>
  <o-ex:agreement>
   <o-ex:asset>
    <o-ex:context>
     <o-dd:uid> cid:media123@oma.com</o-dd:uid>  ~ 610
    </o-ex:context>
    <o-ex:inherit>
     <o-ex:context>
      <o-dd:uid>ParentAssetUID</o-dd:uid>  ~ 602                     ~ 600
     </o-ex:context>
    </o-ex:inherit>
    <o-ex:digest>
     <ds:DigestMethod Algorithm="http://www.w3.org/2000/09/xmldsig#sha1"/>
     <ds:DigestValue>DCFHash</ds:DigestValue>
    </o-ex:digest>
    <ds:KeyInfo>
     <xenc:EncryptedKey>
      <xenc:EncryptionMethod Algorithm="http://www.w3.org/2001/04/xmlenc#kw-aes128"/>
      <ds:KeyInfo>
       <ds:RetrievalMethod URI="REKReference"/>
      </ds:KeyInfo>
      <xenc:CipherData>
       <xenc:CipherValue>EncryptedCEK</xenc:CipherValue>
      </xenc:CipherData>
     </xenc:EncryptedKey>
    </ds:KeyInfo>
   </o-ex:asset>
  </o-ex:agreement>
</o-ex:rights>
```

DEVICE AND METHOD FOR ENFORCING ADVERTISEMENT VIEWING

PRIORITY

This application claims priority under 35 U.S.C. § 119(a) to a Korean Patent Application filed in the Korean Intellectual Property Office on Aug. 24, 2010 and assigned Serial No. 10-2010-0082187, the entire disclosure of which is incorporated herein by reference.

BACKGROUND OF THE INVENTION

Field of the Invention

The present invention relates generally to an advertisement service device and method, and more particularly, to a device and method for enforcing advertisement viewing before providing services or contents to users.

Description of the Related Art

A device accesses a content providing server to receive a multimedia service such as a broadcast service or a Video On Demand (VOD) content transmission service. Thus, a user of the device is charged with a service fee corresponding to an access time to the content providing server or an amount of data serviced. A push method is used to unilaterally transmit advertisements provided together with a service. For situations in which the service is linked with an advertisement, a user of the device is forced to view the advertisement before receiving the service, thus enabling the user to enjoy the service at low cost.

A Digital Rights Management (DRM) technique is used to protect multimedia services or contents from illegal distribution. The DRM technique has been developed to provide secure distribution of fee-charging services or contents and prevent an illegal distribution thereof. The DRM technique protects the rights and benefits of a service provider or a content provider, prevents illegal copy, and supports creation, distribution and management of services or contents, such as payment and fee charge, on a batch basis.

As described above, the DRM technique, used for protection of services or contents, allows the play of services or contents only in devices of users that have purchased rights by payment. Accordingly, the DRM technique can give the right to play services or contents in subordination to a device, and can restrict the types of content and the number of times content is playable in the device. However, users desiring to enjoy high-priced services or contents may be interested in reducing the service fee. Thus, a method of providing advertisements together with a multimedia service can reduce the service fee, thereby expanding the consumption of multimedia services.

A method of forcing users to view advertisements provided together with a service is required. Advertisements in multimedia services can be implemented in various ways due to a continuous increase in the use of multimedia services. A scheme is required for efficiently supporting the right and restriction linked with the consumption of advertisements on multimedia services.

Video advertisements can be provided together with multimedia services, and audio advertisements, paper advertisements, and advertisements implemented in applications such as pictures and flashes can be introduced.

SUMMARY OF THE INVENTION

The present invention has been made to address at least the above problems and/or disadvantages and to provide at least the advantages described below. Accordingly, an aspect of the present invention provides a device and method for enforcing advertisement viewing before providing multimedia services to users.

Another aspect of the present invention provides a device and method for enforcing advertisement viewing in linkage with a DRM technique for protecting multimedia services.

An additional aspect of the present invention provides a device and method for enforcing viewing of various advertisements.

A further aspect of the present invention provides a device and method for enforcing viewing of advertisements linked to contents in common.

According to an aspect of the present invention, a method is provided for enforcing advertisement viewing in a device. When there is a play request for requested contents, it is determined whether there is a common Rights Object (RO) linked with an RO of the requested contents. When there is a common RO, information about consumption of advertisements on a plurality of contents is obtained from the common RO. At least one advertisement linked with the requested contents is played on the basis of the obtained information.

According to another aspect of the present invention, a device is provided for enforcing advertisement viewing. The device includes a multimedia player for transmitting a play request for contents. The device also includes a Digital Rights Management (DRM) agent for determining whether there is a common RO linked with an RO of the requested contents, obtaining information about consumption of advertisements on a plurality of contents from the common RO when there is a common RO, transmitting at least one advertisement on the requested contents to the multimedia player on the basis of the obtained information, and transmitting the requested contents to the multimedia player upon completion of advertisement play in the multimedia player, wherein the multimedia player plays the at least one advertisement for a predetermined play enforcement time and requests the contents from the DRM agent upon completion of the advertisement play.

BRIEF DESCRIPTION OF THE DRAWINGS

The above and other aspects, features and advantages of the present invention will be more apparent from the following detailed description when taken in conjunction with the accompanying drawings, in which.

DETAILED DESCRIPTION OF EMBODIMENTS OF THE PRESENT INVENTION

Embodiments of the present invention are described in detail below with reference to the accompanying drawings.

The same or similar components may be designated by the same or similar reference numerals although they are illustrated in different drawings. The present invention may, however, be embodied in different forms and should not be construed as limited to the embodiments set forth herein; rather, these embodiments are provided so that this disclosure will be thorough and complete, and will fully convey the scope of the present invention to those skilled in the art. Detailed descriptions of constructions or processes known in the art may be omitted to avoid obscuring the subject matter of the present invention.

For the sake of convenience, terms regarding entities and technologies defined in DRM of Open Mobile Alliance (OMA), which is an organization for standardization of applications of mobile broadcasting, are used to describe the embodiments of the present invention. However, it should be noted that the scope of the present invention is not limited by such terms, and embodiments of the present invention may also be applicable to systems with similar technical backgrounds.

An embodiment of the present invention relates to a process of determining whether information about enforced advertisement viewing is included from an RO of contents, determining an advertisement linked with the contents and the type of advertisement linked to the contents if the information about enforced advertisement viewing is included, and playing the advertisement linked to the contents on the basis of the determination result.

Another embodiment of the present invention relates to a process of determining whether a common RO linked to an RO of contents is present, obtaining information about the consumption of an advertisement linked to contents from the common RO if the common RO is present, and playing the advertisement linked to the contents on the basis of the obtained information.

Figure 1:
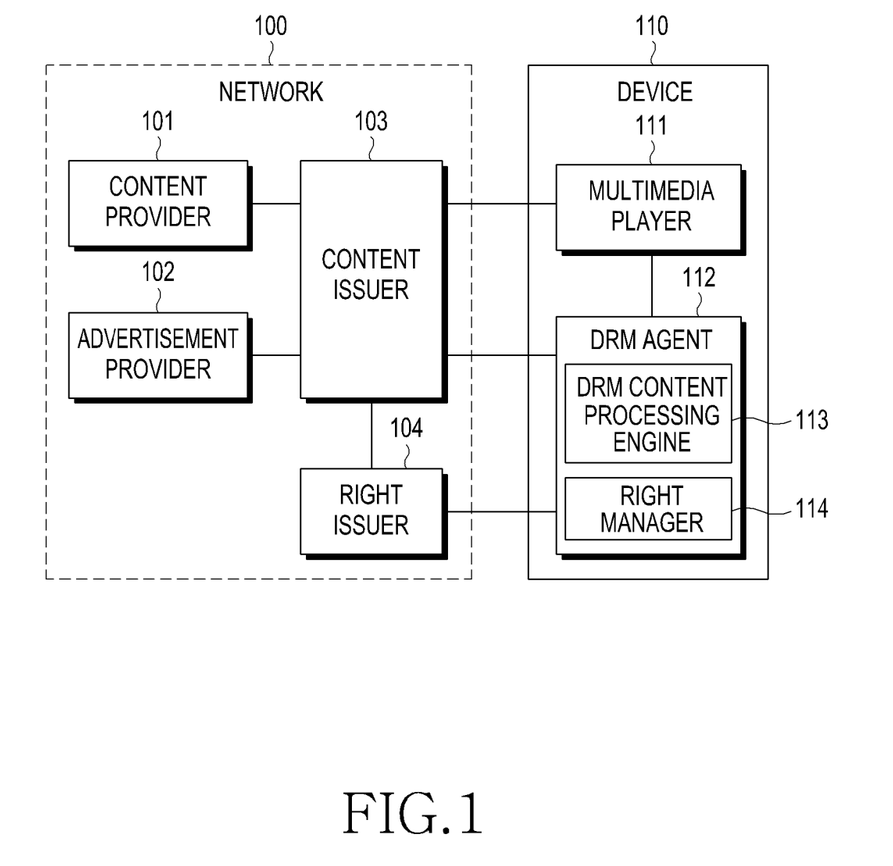
FIG. 1 is a block diagram illustrating a system for providing a multimedia service linked with an advertisement, according to an embodiment of the present invention.

FIG. 1 is a block diagram of a system for providing a multimedia service linked with an advertisement, according to an embodiment of the present invention. In particular, FIG. 1 illustrates entities that participate in an enforced advertisement viewing method in linkage with a DRM technique for protecting multimedia services. In this embodiment of the present invention, services and contents to be protected by a DRM technique are defined as multimedia services. Thus, a content provider and a content issuer illustrated in FIG. 1 may also serve as a service provider and a service issuer, respectively. Specifically, the content provider may provide contents or services. However, for the sake of convenience, a description will be provided in which the content provider provides contents.

Referring to FIG. 1, a network 100 may include a Content Provider (CP) 101 providing contents or services, and an Advertisement Provider (AP) 102 providing advertisements.

The CP 101 provides contents to a Content Issuer (CI) 103, and the AP 102 provides advertisements to CI 103.

The CI 103 approves contents in a DRM-based system and processes a content request received from a user. Also, the CI 103 may transmit an encryption key, which is necessary to play contents encrypted according to an agreement with a Rights Issuer (RI) 104, and an RO containing a play right for the contents to a device 110 of the user.

According to an embodiment of the present invention, the CI 103 selects an advertisement to be transmitted together with contents and generates a content/advertisement package. The contents and the advertisement may be transmitted to the device 110 simultaneously or by different means. In this embodiment of the present invention, configuration information of the content/advertisement package may be provided according to a preliminary agreement by the CI 103 or the RI 104.

The device 110 may include a multimedia player 111 and a DRM agent 112. The device 110 may be implemented in hardware, software, or a combination thereof. The device 110 may consume contents that are provided by the network 100 using a DRM technique.

The multimedia player 111 is an entity capable of playing contents and advertisements. The multimedia player 111 receives decrypted contents or advertisements from the DRM agent 112 and plays the received contents. Also, the multimedia player 111 receives encrypted contents or advertisements and a key for decrypting the contents or advertisements from the DRM agent 112, decrypts the received contents or advertisements, and plays the decrypted contents or advertisements.

The DRM agent 112 may include a DRM Content Processing Engine (DCPE) 113 and a Rights Manager (RM) 114. The DCPE 113 decrypts encrypted contents or advertisements in response to the content request, provides the decrypted contents or advertisements to the multimedia player 111, and retrieves a decryption key for the decrypting operation from the RM 114.

The RM 114 registers the device 110 in the RI 104, obtains an RO of contents to be consumed by the device 110, and manages the consumption of the RO. The entities on the network 100 may be different entities or complex entities, and the entities on the device 110 may also be different entities or complex entities.

The RM 114 obtains and analyzes an RO that is provided to enforce viewing of various advertisements for a predetermined time according to an embodiment of the present invention. According to an embodiment of the present invention, the RM 114 detects an RO of requested contents and determines whether there is a common RO linked to the detected RO. If there is a common RO linked to the detected RO, the RM 114 analyzes the common RO to determine an advertisement to be transmitted before playing of the requested contents, and the type of the advertisement.

The common RO represents common right and control conditions for enforcing an advertisement on a plurality of contents in common. The common RO supports, in common, the right and control conditions linked with the consumption of various advertisements on a plurality of contents. Accordingly, advertisements linked to all contents can be controlled by only one common RO without the need to separately give a right and a restriction to each RO. The right and the restriction can be updated by updating only the common RO, thereby enabling efficient management of ROs linked with advertisements.

Figure 2:
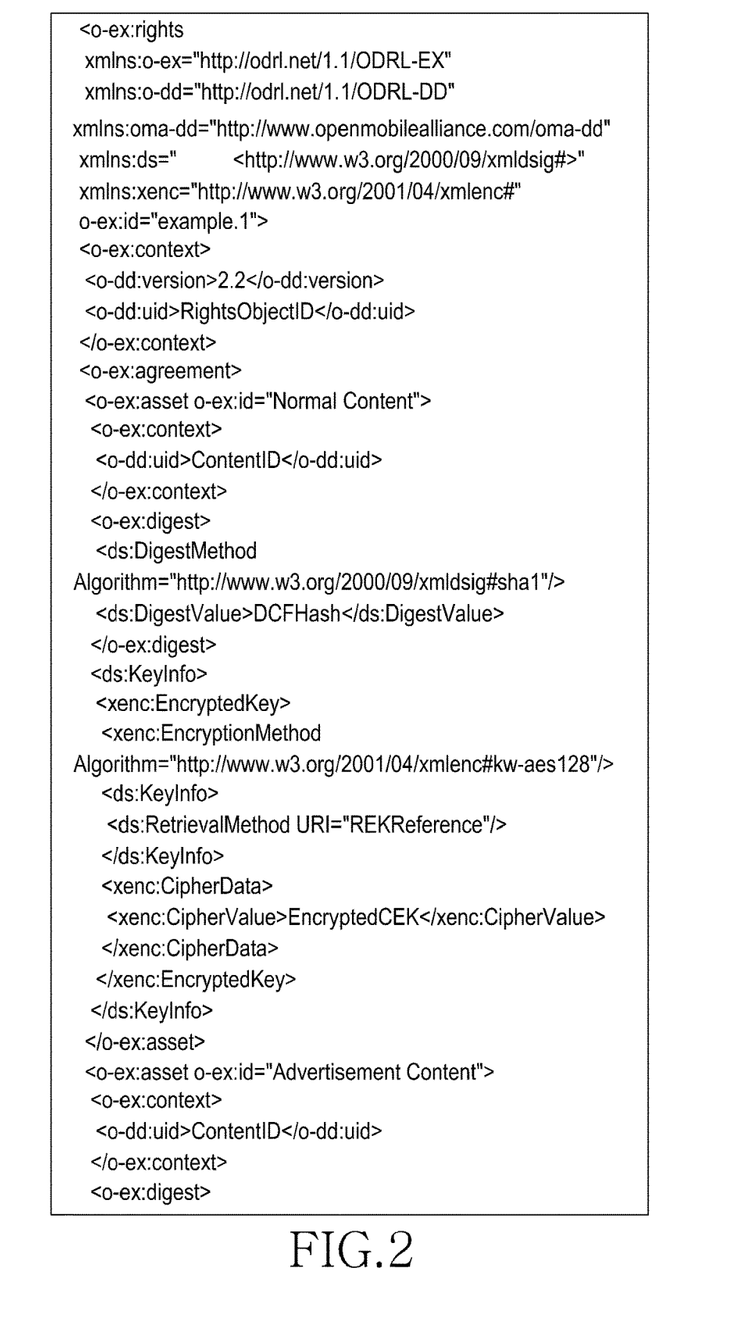
FIGS. 2 and 3 illustrate a structure of an RO, according to an embodiment of the present invention.
Figure 3:
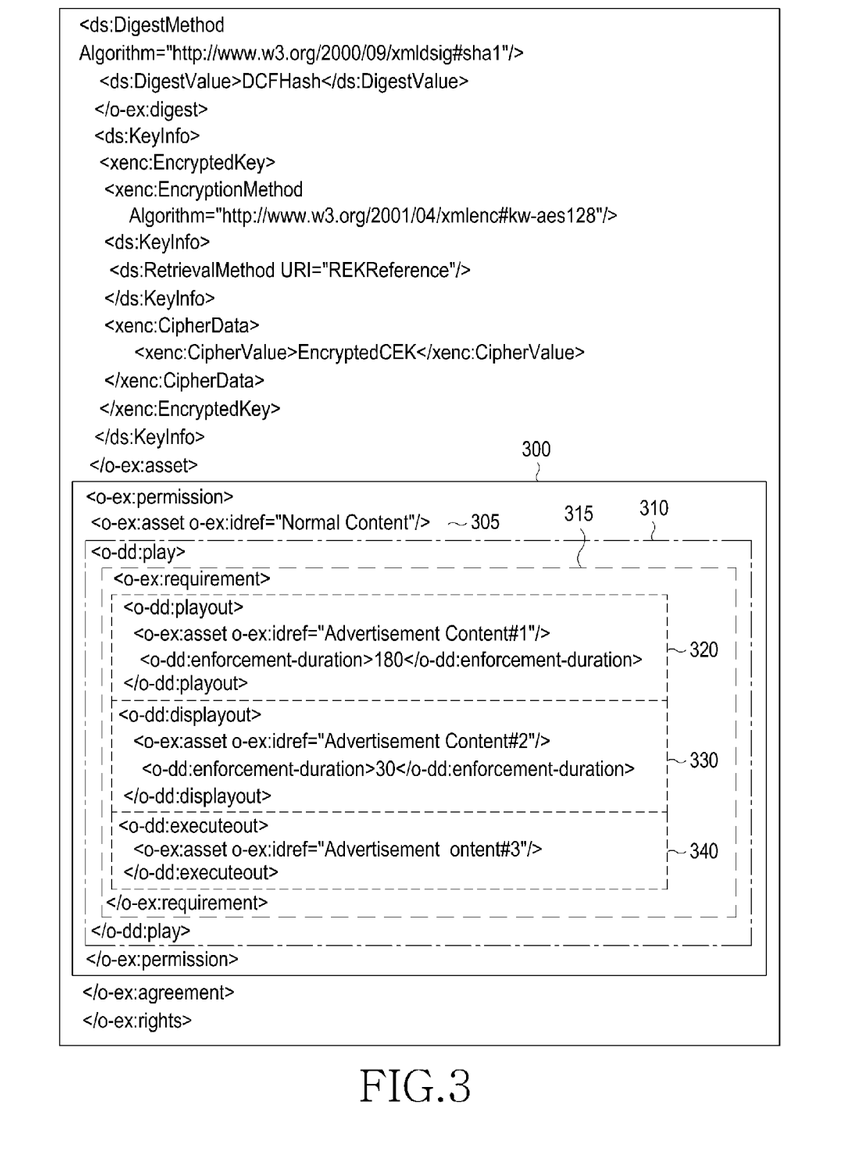

FIGS. 2 and 3 illustrate a structure of an RO, according to an embodiment of the present invention. FIG. 3 is a continuation of FIG. 2. In FIGS. 2 and 3, general details described in Rights Expression Language (REL) will be omitted. The omitted details of REL in the present invention will follow the OMA DRM REL standard, and only the details relating to the present invention are described herein. The REL is a technical standard defined to express an RO in the OMA DRM technique.

Referring to FIG. 2, the RO starts with an element 'right', and the element 'right' has sub-elements 'context' and 'agreement'. The sub-element 'context' provides context information such as an identifier of the RO and a version of the DRM used. FIG. 2 illustrates that the identifier of the RO is 'RightsObjectID' and the version of the DRM used is '2.2'. Also, the sub-element 'agreement' provides an identifier of contents used in accordance with the RO, information about the encryption/decryption of contents, and details about the contents.

Referring to FIG. 3, a 'permission' element 300 is to set the right scope of contents connected to the RO, and is a subordinate element of the sub-element 'agreement'. The 'permission' element 300 prescribes the restrictions and the operation range (e.g., play, display, execute, and print) of the contents indicated by the RO. An 'asset' element 305 is to provide an identifier of the contents connected to the RO, and is a sub-element of the 'permission' element 300.

A 'play' element 310 informs that the play of contents indicated by the 'asset' element 305 is permitted. The contents in a 'requirement' element 315 are satisfied before execution of the 'play' element 310, so that the DRM agent 112 provides decrypted contents or decryption information for content decryption to the multimedia player 111. According to an embodiment of the present invention, the 'requirement' element 315 is used to enforce an advertisement on contents and link various advertisements to contents. The 'requirement' element 315 has subordinate elements 'playout' 320, 'displayout' 330 and 'executeout' 340.

Table 1 below shows an example of the 'requirement' element 315 according to an embodiment of the present invention, to which the present invention is not limited.

TABLE 1

| Element | <!ELEMENT o-ex:requirement (o-dd:tracked?, o-dd:playout?, o-dd:displayout?, o-dd:excuteout?,)> |
|---|---|
| Semantics | The <requirements> element contains an optional <tracked> element, an optional <playout>element, an optional<displayout>element and an optional <excuteout>element. Requirements are associated with one permission element at a time. For a permission to be granted all its requirements MUST be fulfilled. If a requirement is not understood or cannot be enforced by the consuming Device the associated permission is invalid and MUST NOT be granted. If present, a <requirement> element SHOULD contain the <tracked> element. If a <requirement> element does not contain the <tracked> element, it does not require any specific pre-condition to be fulfilled. If present, a <requirement> element SHOULD contain <playout> element, <displayout> element, or <executeout> element for advertisement control. The usage of <playout> element, <displayout> element, or <executeout> element depends on the kinds of advertisement. For example, if advertisement is AV content, then <playout> element is used, if advertisement is text or a graphic, then <displayout> element is sued, and if advertisement is program or application, then <executeout> element is used. The <requirement> element MUST only be present as a child element to other permission elements such as <play> and <display>, it MUST NOT be present as a top-level requirement. If a DRM Agent receives an RO with a top-level requirement it MUST ignore this requirement. |

Referring to Table 1, the 'requirement' element 315 defines an A/V-type advertisement playing method, a text or picture-type advertisement playing method, and a program or application-type advertisement playing method, and may include one or more advertisement playing methods for each type of advertisement.

The 'playout' element 320 is one of the advertisement playing methods, and serves to enforce viewing of an A/V-type advertisement for a predetermined time before allowing an access to the right to play multimedia contents linked with the advertisement. Table 2 below shows an example of the 'playout' element 320.

TABLE 2

| Element | <!ELEMENT o-dd:playout (o-dd:enforcement-duration, o-ex:asset+)> |
|---|---|
| Semantics | The <playout> element indicates that a specific DRM content. (e.g. advertisement content) MUST be played before its parent permission can be exercised. It contains mandatory <enforcement-duration> element. The <asset> elements specified within the <playout> element allow linking of this requirement to the DRM content that must be played. It is possible to link <playout> element and its sibling elements to DRM Content referenced by <asset> elements contained in an <agreement> element. The link is established through the use of the "id" and "idref" attributes specified |

Table 2 represents "Element <playout>", and defines that an advertisement content indicated by the 'asset' element in the 'playout' element 320 of FIG. 3 must be played during an 'enforcement duration' element. Specifically, the 'playout' element 320 indicates that an advertisement type is an A/V type, and defines the minimum play time of the A/V-type advertisement. In the 'playout' element 320 of FIG. 3, it is illustrated that a content 'Advertisement Content#1' must be played for 180 seconds.

The 'enforcement duration' represents an advertisement play enforcement state, and includes 'Enforcement Period' and 'Grace time'. The 'Enforcement Period' represents an advertisement play enforcement period, and the 'Grace time' represents a period when the DCPE 113 can request a content decryption key from the RI 104 so that the contents can be played seamlessly after the play of the advertisement.

The 'displayout' element 330 serves to enforce viewing of a text or picture-type advertisement for a predetermined time before allowing access to the right to play multimedia contents linked with the advertisement. Table 3 below shows an example of the 'displayout' element 330.

TABLE 3

| Element | <!ELEMENT o-dd:displayout (o-dd:enforcement-duration, o-ex:asset+)> |
|---|---|
| Semantics | The <displayout> element indicates that a specific DRM content (e.g. advertisement content) MUST be displayed before its parent permission can be exercised. |
| | It contains mandatory <enforcement-duration> element. |
| | The <asset> elements specified within the <displayout> element allow linking of this requirement to the DRM content that must be played. |
| | It is possible to link <displayout> element and its sibling elements to DRM Content referenced by <asset> elements contained in an <agreement> element. The link is established through the use of the "id" and "idref" attributes specified |

Table 3 represents "Element <displayout>", and defines that a content indicated by the 'asset' element in the 'displayout' element 330 of FIG. 3 must be displayed during an 'enforcement duration' element. Specifically, the 'displayout' element 330 indicates that an advertisement type is a text or picture type, and defines the minimum display time of the text or picture-type advertisement.

The 'executeout' element 340 serves to enforce viewing or using of a program or application-type advertisement for a predetermined time before allowing access to the right to display multimedia contents linked with the advertisement. Table 4 below shows an example of the 'executeout' element 340.

TABLE 4

| Element | <!ELEMENT o-dd:executeout (o-ex:asset+)> |
|---|---|
| Semantics | The <executeout> element indicates that a specific DRM content (e.g. advertisement content) MUST be executed before its parent permission can be exercised. |
| | The <asset> elements specified within the <executeout> element allow linking of this requirement to the DRM content that must be played. |
| | It is possible to link <executeout> element and its sibling elements to DRM Content referenced by <asset> elements contained in an <agreement> element. The link is established through the use of the "id" and "idref" attributes specified |

Table 4 represents "Element <executeout>", and defines that an application advertisement indicated by the 'asset' element in the 'executeout' element 340 of FIG. 3 must be executed before the use of contents. That is, the 'executeout' element 340 indicates that an advertisement type is an application type.

The 'executeout' element 340 is different from the 'playout' element 320 and the 'displayout' element 330 in that it does not contain 'enforcement duration'. The reason for this is that rich media such as applications or flashes have an inherent execution time and thus, it is unnecessary to set a separate play enforcement time. As described above, it is possible to enforce the viewing of various advertisements by using the 'playout' element 320, the 'displayout' element 330, and 'executeout' element 340.

FIG. 3 illustrates an example of an RO that uses the 'playout' element 320, the 'displayout' element 330, and the 'executeout' element 340. Referring to FIG. 3, the 'playout' element 320 in the 'requirement' element 315 represents one A/V advertisement, the 'displayout' element 330 represents one text advertisement, and the 'executeout' element 340 represents one application A/V advertisement.

The 'playout' element 320, the 'displayout' element 330, and the 'executeout' 340 may be used to designate an advertisement type, and the number of advertisements may be designated according to the number of the 'playout' element 320, the 'displayout' element 330, and the 'executeout' element 340. For example, 7 'playout' elements, 2 'displayout' elements, and 5 'executeout' elements may be prescribed in the 'requirement' element 315 to control 7 A/V advertisements, 2 text advertisements, and 5 application advertisements. FIGS. 2 and 3 illustrate a structure of the RO, and the RO may be configured in another method according to the present invention. Although FIGS. 2 and 3 illustrate that three advertisements (e.g., a video advertisement, a text advertisement, and an application advertisement) are linked to contents, the type and number of such advertisements may vary according to business models.

The advertisement play order may be determined according to the order of the 'playout' element 320, the 'displayout' element 330 and the 'executeout' element 340 defined in the 'requirement' element 315. If the 'playout' element 320 or the 'displayout' element 330 is located at the lowest position in the 'requirement' element 315, it has 'gracetime' as an optional subordinate element, thereby making it possible to minimize the time taken to play contents after the play of advertisements.

Figure 4:
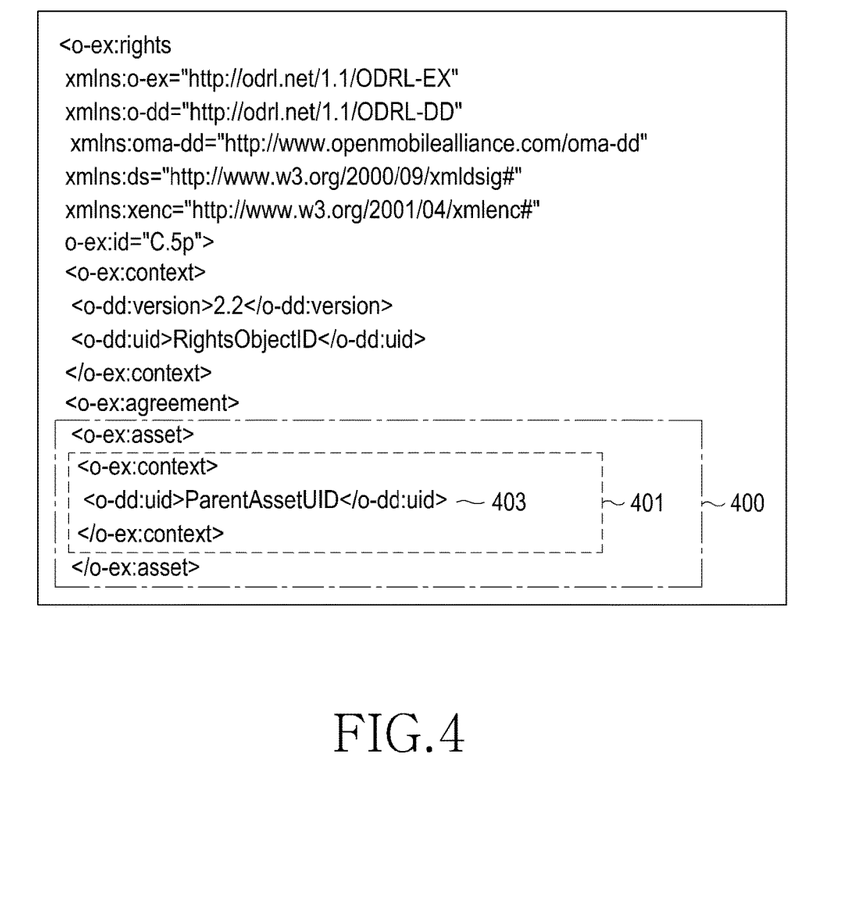
FIGS. 4 and 5 illustrate a structure of a common RO, according to another embodiment of the present invention.
Figure 5:
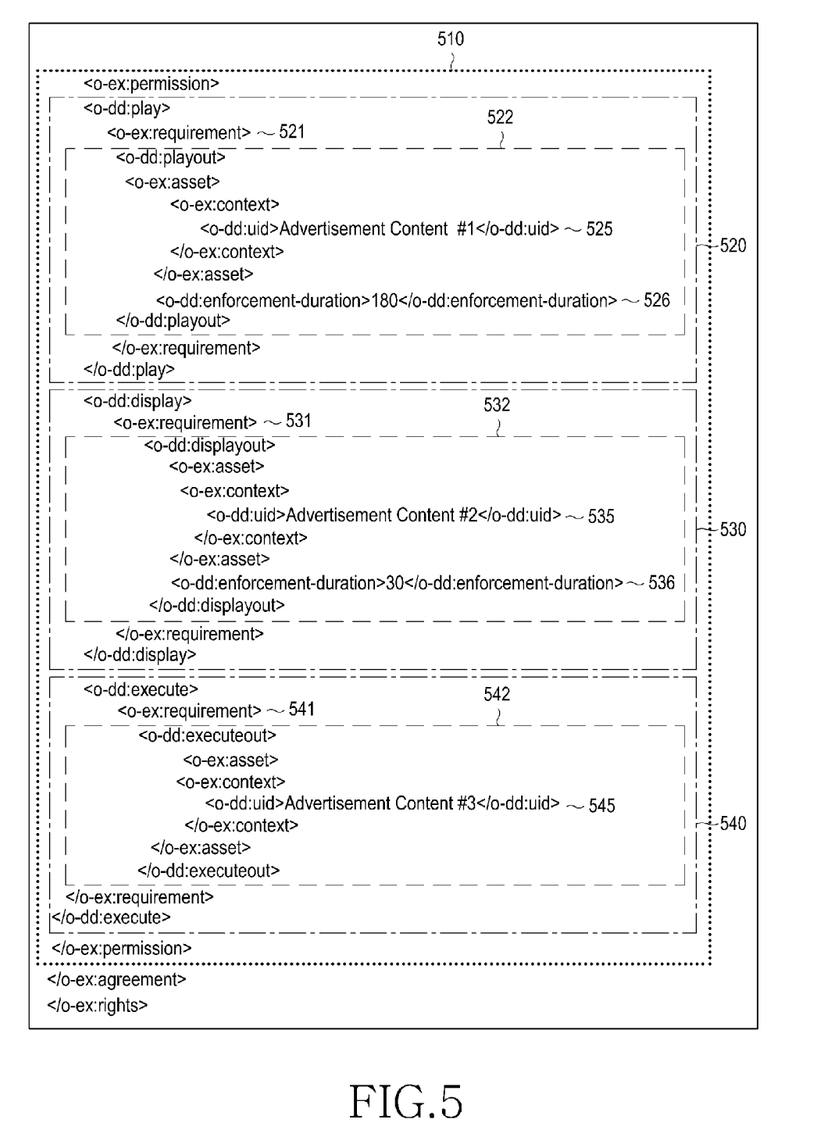
Figure 6:
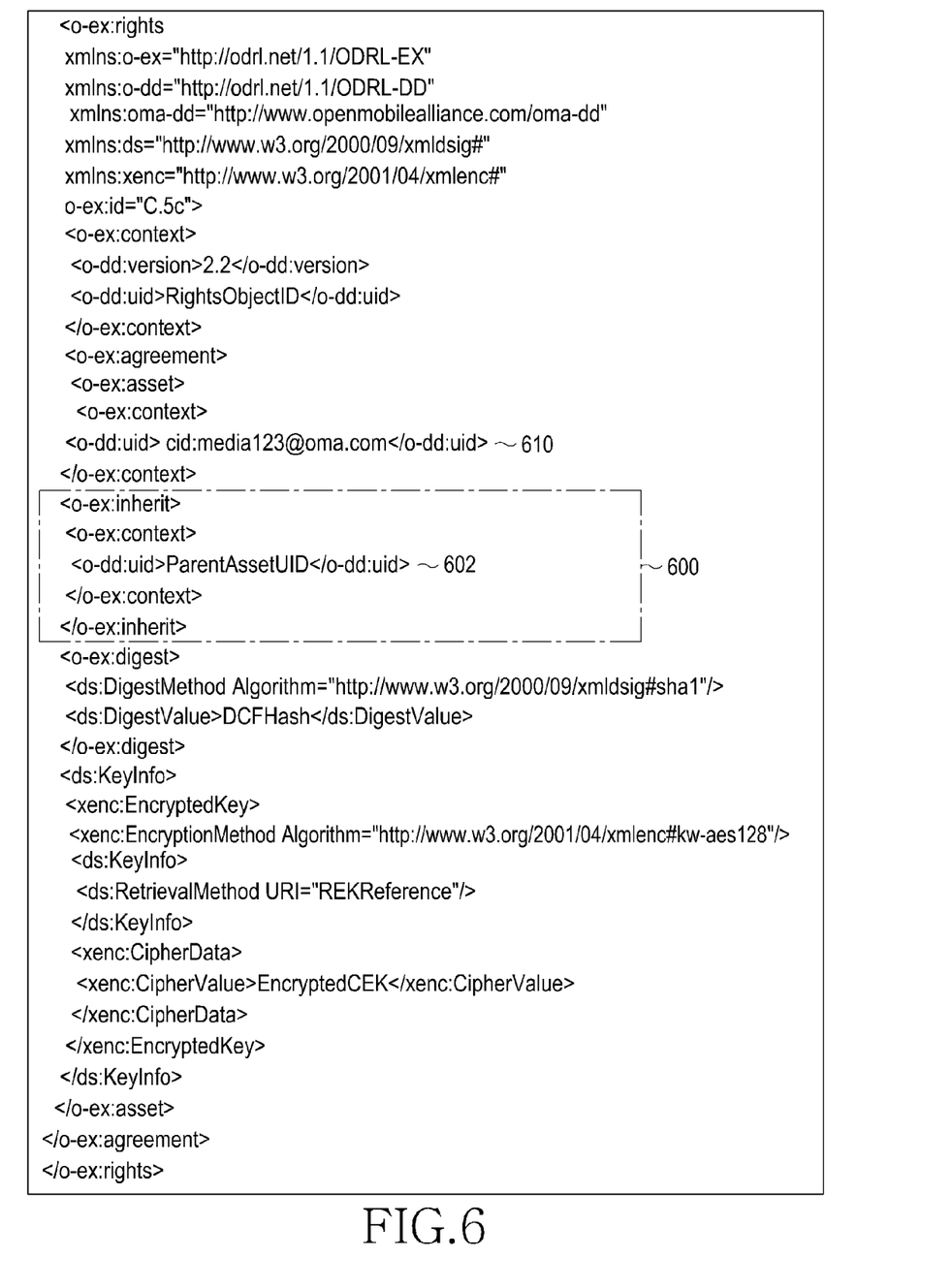
FIG. 6 illustrates a structure of an individual RO for contents, according to another embodiment of the present invention.

An RO according to another embodiment of the present invention is described below with reference to FIGS. 4 to 6. FIGS. 4 and 5 illustrate a structure of a common RO, according to another embodiment of the present invention. FIG. 5 is a continuation of FIG. 4. FIG. 6 illustrates a structure of an individual RO for contents, according to another embodiment of the present invention. In the following description, a common RO will be referred to as a Parent Rights Object (PRO), and an individual RO will be referred to as a Child Rights Object (CRO). The undescribed features of PRO and CRO are not directly related to another embodiment of the present invention, and they are described in detail in OMA DRM REL 2.2.

In another embodiment of the present invention, the CRO means a right prescribed for each content, and contains reference information for connection with the PRO. The PRO represents common right and restriction for enforcing an advertisement on a plurality of contents in common.

The PRO prescribes 'permission' and 'constraint' that can be applied in common to a plurality of contents by one RO. The CRO has information for providing a connection link with the PRO having the 'permission', because it is prescribed for each content. Accordingly, it is possible to apply 'permission' and 'constraint' in common even if consumed contents vary.

As described above, another embodiment of the present invention provides a method for forcing a user to view various advertisements when viewing a plurality of contents, by using the relationship between the CRO and the PRO.

The CRO and the PRO may be connected through elements shown in Table 5 below.

TABLE 5

| Element | <!ELEMENT o-ex:inherit (o-ex:context)> |
|---|---|
| Semantics | The <inherit> element specifies the inheritance of Permissions and Constraints from one Rights Object to another in order to allow parent/child relationships to be defined. This enables Rights Issuers to efficiently support, for example, subscription business models.<br>A parent Rights Object defines Permissions and Constraints for DRM Content which can be inherited by child Rights Objects. Child Rights Objects usually reference DRM Content whereas parent Rights Objects do not reference DRM Content themselves.<br>When exercising permissions. Child Rights Objects inherit from a single corresponding parent Rights Object by including this <inherit> element. The <uid> element of the <context> element in the <inherit> element MUST match the value of the <uid> element of the <context> element of the <asset> element of the corresponding parent Rights Object. If the parent Rights Object referenced by a child Rights Object does not exist, the DRM Agent MUST NOT grant access to the DRM Content according to this child Rights Object if there are no applicable <permission> elements within the child Rights Object itself. When the child refers to multiple parent Rights Objects, the DRM Agent MUST select exactly one of these from which the child is allowed to inherit permissions and constraints. This selection SHALL be done in accordance with the Rights Objects selection algorithm as defined in section 5.10.<br>For each consumption of the DRM Content, the agent MUST select exactly one <permission> element from installed rights objects, according to which access will be granted. Note that it is allowed that the Child Rights Object specifies no <permission> elements. In that case, the <permission> elements inherited from the Parent Rights Object still apply.<br>When granting access to DRM Content according to a specific permission element, e.g., <play> of a <permission> element, the DRM Agent MUST enforce the top-level constraints of that <permission> element as well as possible constraints of the specific permission element according to which access is being granted.<br>Child Rights Objects reference DRM Content as usual. i.e., via the <uid> element in the <context> element of the <asset> element. The <asset> element of a Parent Rights Objects may not reference an actual DCF, but contain a "virtual" UID denoting, for example, the subscription itself.<br>Child Rights Objects MUST NOT inherit from more than one parent Rights Object simultaneously, the DRM Agent MUST always select one parent Rights Object from which the Child Rights Object may inherit permissions and constraints. A parent Rights Object MUST NOT be a child Rights Object at the same time. |

Table 5 represents "Element <Inherit>". The 'inherit' element is prescribed in the CRO as illustrated in FIG. 6, and represents connection information with the PRO in order to use the right and restriction prescribed in the PRO as illustrated in FIGS. 4 and 5.

Specifically, the 'inherit' element has an identifier for identification of 'permission' and 'constraint'. Accordingly, by processing the PRO together with the CRO, the DRM agent 112 applies the 'permission' and 'constraint', prescribed in the PRO, to the contents linked to the CRO.

According to another embodiment of the present invention, if it is desirable to use common right and restriction linked with the consumption of advertisements on a plurality of contents, the CI or the RI providing contents linked with advertisements can give the same right and restriction to all linked contents with one RO without the need to separately give a right and a restriction to each RO. Also, according to another embodiment of the present invention, the right and the restriction can be updated by updating only one RO, thus facilitating the management of ROs linked with advertisements.

An 'asset' element 400 of FIG. 4 defines an identifier of a PRO to be referenced through an 'inherit' element 600 of a CRO of FIG. 6. The 'asset' element 400 has 'context' element 401 as a factor. The 'context' element 401 provides a 'ParentAssetUID' element 403 so that the CRO can reference the right and control conditions of the PRO of FIGS. 4 and 5.

A 'permission' element 510 of FIG. 5 prescribes the permission conditions for contents by the CROs linked with the PRO. The 'permission' element 510 has elements 'play' 520, 'display' 530 and 'execute' 540 for permitting operations of play, display and execution with respect to the contents linked with the CRO.

In FIG. 5, regardless of the types of contents, the elements 'play' 520, 'display' 530 and 'execute' 540 are used to give rights of play, display and execution. However, if the contents are audio/video contents, the 'play' element 520 may be used to set a play right. Likewise, if the contents are picture or document contents, the 'display' element 530 may be used to set only a display right. Also, if the contents are programs such as games, the 'execute' element 530 may be used to set only an execution right. If a plurality of rights such as play, display and execution are set, the DRM agent 112 uses the right optimal for the type of contents linked with the CRO.

The elements prescribing the operation ranges and restrictions of contents will be described in detail below. A 'play' element 520 has a 'requirement' element 521 that is a condition to be satisfied before the execution of contents linked with the CRO. The 'requirement' element 521 has a 'playout' element 522 and an 'enforcement duration' element 526 as factors. According to the 'playout' element 522, advertisement content #1 525 is forcibly played for a period defined in the 'enforcement duration' element 526, for example, 180 seconds.

A 'display' element 530 has a 'requirement' element 531 that is a condition to be satisfied before the execution of contents linked with the CRO. The 'requirement' element 531 has a 'displayout' element 532 and an 'enforcement duration' element 536 as factors. According to the 'displayout' element 532, advertisement content #2 535 is forcibly displayed for a period defined in the 'enforcement duration' element 536, for example, 30 seconds.

An 'execute' element 540 has a 'requirement' element 541 that is a condition to be satisfied before the execution of contents linked with the CRO. The 'requirement' element 541 has 'executeout' element 542 as a factor. According to the 'executeout' element 542, advertisement content #3 545 is forcibly executed.

FIG. 5 illustrates that the rights of 'play' 520, 'display' 530 and 'execute' 540 have the elements of 'playout' 522, 'displayout' 532 and 'executeout' 542, respectively. However, according to the type of advertisements to be viewed, the right of 'play' 520 may have all of the elements of 'playout' 522, 'displayout' 532 and 'executeout' 542. The same method may be applied to the rights of 'display' 530 and 'execute' 540.

A CRO of FIG. 6 provides a content identifier 610 indicating contents linked with the CRO. The content identifier 610 means that the right for the contents indicated by the content identifier 610 is set by the CRO of FIG. 6. Also, the CRO contains reference information that can make reference to the PRO of FIGS. 4 and 5, and has an 'inherit' element 600 for this purpose. The 'inherit' element 600 provides a 'ParentAssetUID' 602 that is an identifier for the right and control conditions for the PRO of FIG. 5. The 'ParentAssetUID' 602 represents an identifier of a PRO to be referenced, and is defined in the same manner as the 'ParentAssetUID' 403 of FIG. 4. Through the 'ParentAssetUID' 602, the right and control conditions defined in the PRO of FIG. 5 can be used for the contents indicated by the content identifier 610.

Accordingly, separate right and control conditions for contents are not prescribed in the CRO of FIG. 6, and the right and control conditions for the PRO of FIG. 5 are applied to the contents indicated by the content identifier 610. Thus, the CRO of FIG. 6 is defined for each content and is connected to the PRO of FIG. 5 by the 'inherit' element 600. Accordingly, the same right and control conditions can be used for various advertisements to be viewed before the play of contents.

Figure 7:
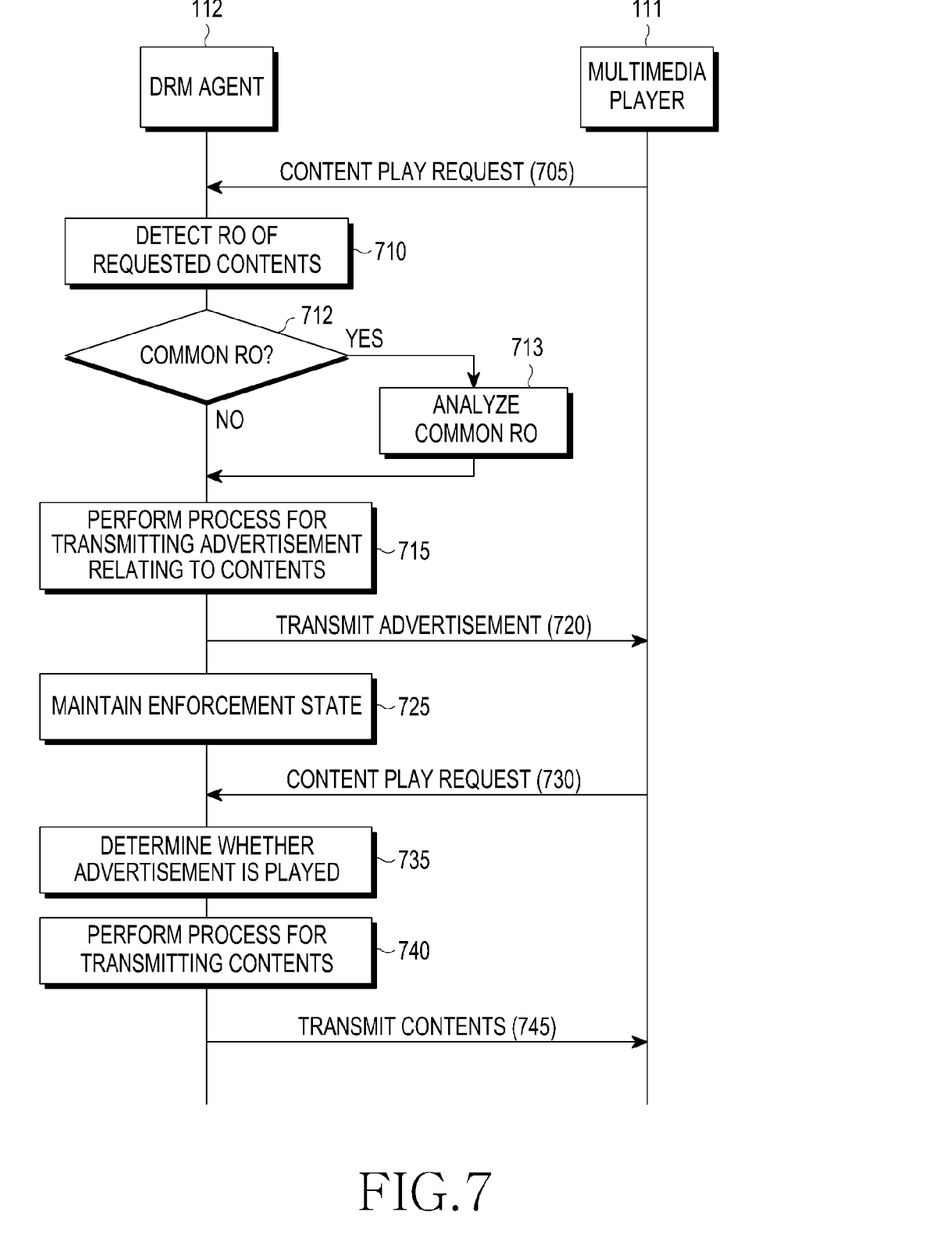
FIG. 7 is a flow diagram illustrating an operational process between a multimedia player and a DRM agent, according to an embodiment of the present invention.

FIG. 7 is a flow diagram illustrating an operational process between the multimedia player 111 and the DRM agent 112, after the device 110 receives the RO linked with the contents, according to an embodiment of the present invention.

Referring to FIG. 7, the multimedia player 111 transmits a content play request to the DRM agent 112 at the request of the user in step 705. The contents indicated by the content play request are contents that can be played after the viewing of a specific advertisement, and it is assumed in FIG. 7 that the RO containing the right for the contents and information for enforcing advertisement viewing is already transmitted to the DRM agent 112. However, the RO may also be received after the content play request of the user.

In step 710, the DRM agent 112 detects the RO of the requested contents. Specifically, the DRM agent 112 searches for and interprets the RO for the contents indicated by the content play request. The RO, according to an embodiment of the present invention, reflects the type of an advertisement as well as the restriction of enforcing advertisement viewing before providing the contents indicated by the content play request. For example, a 'requirement' element of the RO includes at least one of 'playout' for enforcing the play of an A/V-type advertisement, 'display' for enforcing the display of a text or picture-type advertisement, and 'executeout' for enforcing the use of an application or rich media-type advertisement. Accordingly, information about enforced advertisement viewing and the type of an advertisement are analyzed by detecting the RO of the requested contents.

The RO according to an embodiment of the present invention corresponds to an individual RO. Therefore, an individual RO of the requested contents is detected, and reference information to a common RO is detected from the individual RO. Accordingly, if it is determined in step 712 that there is a common RO, the DRM agent 112 proceeds to step 713 to analyze the common RO that prescribes the right and restriction applicable in common to a plurality of contents.

In step 715, the DRM agent 112 performs a process for transmitting an advertisement linked to the contents. In the process of transmitting an advertisement to the multimedia player 111, the DRM agent 112, according to an embodiment of the present invention, detects the type of the advertisement, the position of the advertisement, the number of relevant advertisements, and the advertisement play order, and decrypts the advertisement if the advertisement was encrypted.

In the process of transmitting an advertisement to the multimedia player 111, the DRM agent 112 according to another embodiment of the present invention detects, from a common RO, the type of the advertisement, the position of the advertisement, the number of relevant advertisements, and the advertisement play order, and decrypts the advertisement if the advertisement was encrypted.

In step 720, the DRM agent 112 transmits the advertisement to the multimedia player 111. Accordingly, advertisement data is outputted to the multimedia player 111. FIG. 7 illustrates that an advertisement/content decryption operation is performed by the DRM agent 112. However, the advertisement/content decryption operation may be performed by the multimedia player 111. In this case, the DRM agent 112 may provide the multimedia player 111 with a decryption key value to be used in the decryption process.

In step 725, the DRM agent 112 maintains an enforcement state. The enforcement state means a state where the DRM agent 112 does not respond to a content request of the multimedia player 111. The time period of the enforcement state is the sum of the 'enforcement duration' of all 'playout' elements, the 'enforcement duration' of all 'displayout' elements, and the execution period of all applications indicated by an 'executeout' element.

After playing the advertisement received from the DRM agent 112, the multimedia player 111 transmits a content play request to the DRM agent 112 in step 730. In step 735, the DRM agent 112 determines whether the advertisement has been played for a time prescribed in the RO. In step 740, the DRM agent 112 performs an operation for providing the contents requested by the multimedia player 111. The operation for providing the contents is an operation of detecting the position of contents and decrypting the contents, or an operation of providing a content decryption key when the contents are decrypted by the multimedia player 111. In step 745, the DRM agent 112 transmits the decrypted contents to the multimedia player 111. Then, the multimedia player 111 provides the contents to the user.

Figure 8:
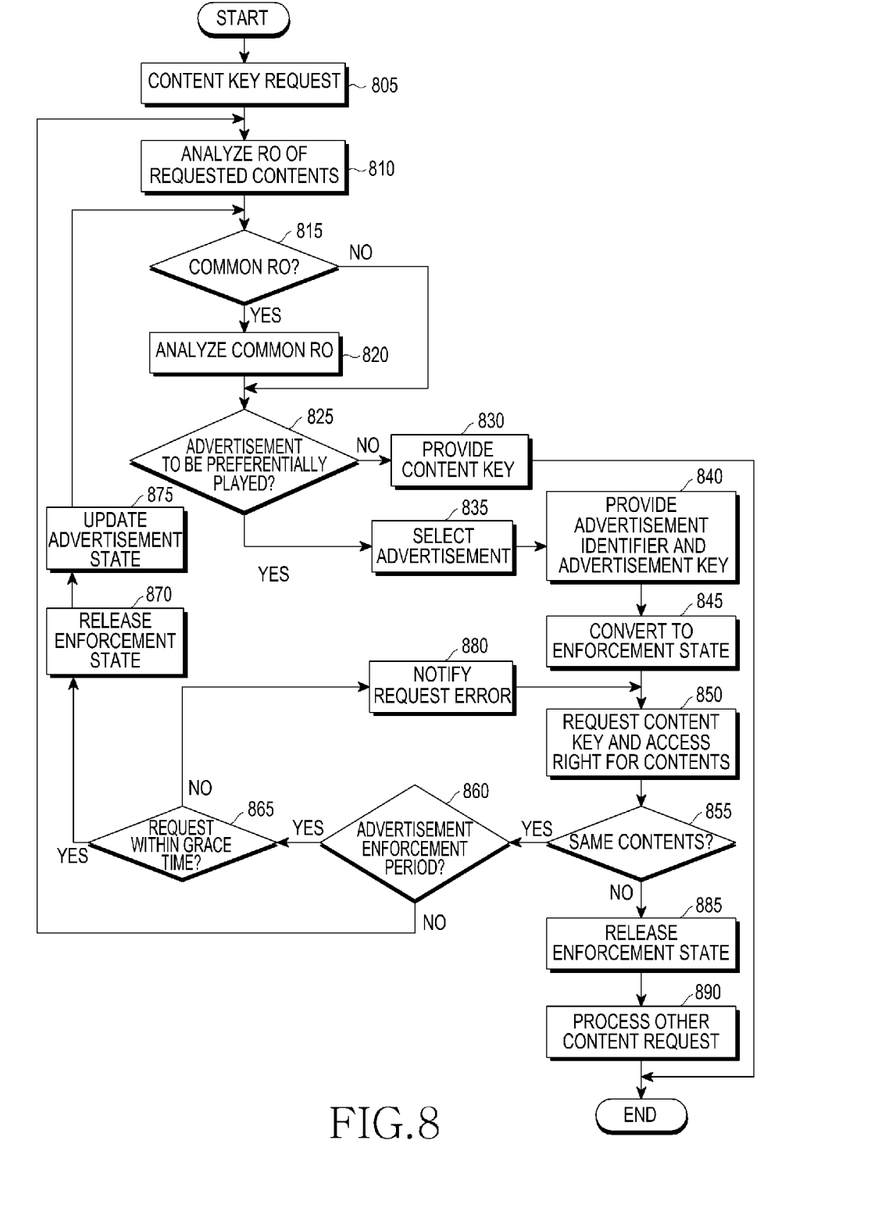
FIG. 8 is a flow diagram illustrating an operational process of a device, according to an embodiment of the present invention.

FIG. 8 is a flow diagram illustrating an operational process of the DRM agent 112 in the device 110 for enforcing the viewing of various advertisements based on DRM, according to an embodiment of the present invention.

In step 805, the DCPE 113 requests the RM 114 to transmit an encryption key for decrypting contents. Specifically, the DCPE 113 requests a content key from the RM 114. In step 810, the RM 114 interprets an RO of the requested contents. In step 815 it is determined whether there is a common RO. If there is reference information to a common RO as a result of the interpretation of an RO, the common RO is analyzed in step 820. If there is no reference information to a common RO in step 815 or after the common RO is analyzed in step 820, it is determined whether the viewing of the decrypted contents must be enforced before the consumption of the contents, in step 825.

If it is determined in step 825 that the requested contents do not require advertisement consumption, the RM 114 provides a content key for the requested contents to the DCPE 113, in step 830. If it is determined in step 825 that advertisement viewing must precede the play of the requested contents, the RM 114 performs an advertisement selecting operation, and more specifically, detects advertisements to be played before the play of the contents and the type of the advertisements, in step 835. According to an embodiment of the present invention, the RO of FIGS. 2 and 3 is analyzed to detect advertisements and the type of the advertisements. According to another embodiment of the present invention, the CRO of FIG. 6 is used to analyze the CRO of FIGS. 4 and 5 to detect advertisements and the type of the advertisements.

As described above, the RM 114 detects not only advertisements to be played before the play of the contents but also the type of the advertisements. The play order of the detected advertisements is also detected. In an embodiment of the present invention, the advertisements may be played in the order defined in the 'requirement' element. In another embodiment of the present invention, the types of advertisements are prioritized so that an application advertisement is preferentially played, to which the present invention is not limited.

In step 840, the RM 114 provides an identifier of the advertisement to be played first among the detected advertisement and an encryption key for encryption of the advertisement to the DCPE 113. In step 845, the RM 114 converts to an enforcement state. In step 850, the DCPE 113 requests an access right for contents and an encryption key for decryption of the contents from the RM 114. The encryption key for decryption of the contents will be referred to as a content key.

In step 855, the RM 114 determines whether the contents requested in step 850 by the DCPE 113 are identical to the contents requested in step 805 by the DCPE 113. If the contents requested in step 850 are not identical to the contents requested in step 805, the RM 114 proceeds to step 885 and releases the enforcement state maintained for the contents requested in step 805. Thereafter, in step 890, the RM 114 performs an operation on the contents requested in step 850. This operation may start from step 810.

On the other hand, when the contents requested in step 850 are identical to the contents requested in step 805, the RM 114 proceeds to step 860. In step 860, the RM 114 determines whether an enforced advertisement viewing time of all advertisements prescribed in the 'requirement' element of the RO has elapsed. If the enforced advertisement viewing time has elapsed (no longer within advertisement enforcement period), the process returns to step 810 so that the DCPE 113 provides an encryption key for decrypting the requested contents.

On the other hand, if the enforced advertisement viewing time has not elapsed (still within advertisement enforcement period), the RM 114 determines in step 865 whether the request is received during a 'grace period'. The 'grace period' uses a value of 'playout' or 'displayout' located at the last position in a 'requirement' element. If 'executeout' is not prescribed at the last position in the 'requirement' element, step 860 is not performed. Herein, since rich media such as applications or flashes have an inherent execution time, an advertisement enforcement time thereof is not prescribed. Therefore, an operation of step 860 may be omitted.

If the RO has 'grace period', and if the request is received within the 'grace period', the RM 114 escapes from the enforcement state in step 870. In step 875, the RM 114 performs an update operation to change the status of an advertisement linked with contents into the viewing status. Thereafter, the above-described steps are repeated to perform an operation for providing the content key.

On the other hand, if the request is received a time period other than the 'grace period', the RM 114 transmits a request error message to the DCPE113 in step 880. FIG. 8 illustrates an operation of the DRM agent 112 described on the assumption that the DRM agent 112 manages all contents by only one enforcement state. If the DRM agent 112 manages a separate enforcement state for each of the contents, it may operate according to another algorithm. In this case, for example, operations in steps 855, 885 and 890 of FIG. 8 may be omitted.

As described above, according to embodiments of the present invention, the user mandatorily views a relevant advertisement before the providing of a multimedia service linked with the advertisement, thereby making it possible to provide a sufficient advertisement effect. Also, various advertisements are viewed by the user, thereby making it possible to maximize the advertisement effect. Also, the user forced to view the advertisement for a predetermined time can enjoy the multimedia service at low cost, thus making it possible to expand the market of multimedia services.

While the invention has been shown and described with reference to certain embodiments thereof, it will be understood by those skilled in the art that various changes in form and detail may be made therein without departing from the spirit and scope of the invention as defined by the appended claims. Therefore, the scope of the invention is defined not by the detailed description of the invention but by the appended claims, and all differences within the scope will be construed as being included in the present invention.

What is claimed is:

1. A method for enforcing advertisement viewing in a device, comprising the steps of:
    searching for a Rights Object (RO) of a requested contents in response to a play request for the requested contents, the RO including right and restriction applicable to advertisement on the requested contents;
    determining whether a common RO linked with the RO exists, at a Digital Rights Management (DRM) agent of the device;
    when the common RO linked with the RU exists, analyzing the common RO that includes common right and restriction applicable in common to advertisements on a plurality of different contents;
    obtaining information about consumption of the advertisements on the plurality of different contents from the common RO, at the DRM agent of the device and playing at least one of the advertisements linked with the requested contents based on the information from the common RO, at the multimedia player of the device; and
    when the common RO linked with the RO does not exist, detecting an advertisement linked with the requested contents from the RO of the requested contents, at the DRM agent of the device, and playing the advertisement, at a multimedia player of the device,
    wherein the common RU is a parent right object of the RO.

2. The method of claim 1, wherein determining whether the common RO linked with the RO exists comprises determining whether reference information of the common RO is included in the RO of the requested contents.

3. The method of claim 2, further comprising, when the reference information of the common RO exists, determining the at least one advertisement linked with the requested contents and a type of the at least one advertisement from the common RO.

4. The method of claim 1, wherein the common RO comprises at least one of a method of playing one or more Audio/Visual (A/V)-type advertisements, a method of playing one or more text or picture-type advertisements, and a method of playing one or more application-type advertisements.

5. The method of claim 1, wherein the common RO comprises at least one of a right for the requested contents, an identifier of the at least one of the advertisements linked with the requested contents, a play method depending on the type of the at least one of the advertisements, and a predetermined play enforcement time.

6. The method of claim 5, wherein playing the at least one of the advertisements linked with the requested contents comprises playing the at least one of the advertisements linked with the requested contents for the predetermined play enforcement time.

7. The method of claim 1, wherein detecting of the advertisement linked with the requested contents comprises:
    detecting a location of the advertisement linked with the requested contents;
    detecting a type of the advertisement; and
    decrypting the advertisement if the advertisement has been encrypted.

* * * * *